United States Patent [19]

Pearlman et al.

[11] Patent Number: 4,589,123
[45] Date of Patent: May 13, 1986

[54] SYSTEM FOR GENERATING SOFT X RAYS

[75] Inventors: Jay S. Pearlman, San Diego; John C. Riordan, Carlsbad; Vance I. Valencia, San Diego, all of Calif.

[73] Assignee: Maxwell Laboratories, Inc., San Diego, Calif.

[21] Appl. No.: 705,969

[22] Filed: Feb. 27, 1985

[51] Int. Cl.$^4$ .................... H05G 1/22; H01J 7/24; G21B 1/00; G21K 5/00
[52] U.S. Cl. ................ 378/106; 315/111.71; 376/143; 376/144; 378/34; 378/119
[58] Field of Search ............... 378/119, 103, 106, 122, 378/34; 376/145, 143, 144; 315/111.21, 111.71, 111.81

[56] References Cited

U.S. PATENT DOCUMENTS

| | | | |
|---|---|---|---|
| 2,700,114 | 1/1955 | Blythe | 307/108 |
| 2,898,482 | 8/1959 | Busch | 307/108 |
| 3,171,030 | 2/1965 | Foster et al. | 378/106 |
| 3,363,102 | 1/1968 | Barbour | 250/102 |
| 3,388,275 | 6/1968 | Bettenhausen et al. | 313/55 |
| 3,746,860 | 7/1973 | Shatas et al. | 250/402 |
| 4,042,827 | 8/1977 | McCorkle et al. | 250/493 |
| 4,042,848 | 8/1977 | Lee | 313/231.6 |
| 4,181,857 | 1/1980 | Miyoshi | 250/402 |
| 4,494,043 | 1/1985 | Stallings et al. | 376/144 |

OTHER PUBLICATIONS

"X-Ray Lithography Using a Pulsed Plasma Source" J. Vac. Scl. Technol., 19(4), Nov./Dec. 1981, pp. 1190-1193.

Primary Examiner—Bruce C. Anderson
Assistant Examiner—T. N. Grigsby
Attorney, Agent, or Firm—Fitch, Even, Tabin & Flannery

[57] ABSTRACT

A system for generating soft X rays. This system includes valve apparatus for repetitively providing bursts of a gas of brief duration and a magnetic pulse compression power supply for providing high current pulses. The system further includes a transmission line connected to the power supply for transmitting power pulses from the supply to discharge through bursts of gas. The power supply includes a plurality of series saturable inductor magnetic switches and a plurality of shunt capacitors. Thus, upon synchronized provision of a burst of gas from the valve apparatus and a power pulse from the power supply, a high current discharge generates plasma and an intense magnetic field which radially compresses the plasma, resulting in a dense, high temperature plasma which is an intense source of soft X rays.

7 Claims, 11 Drawing Figures

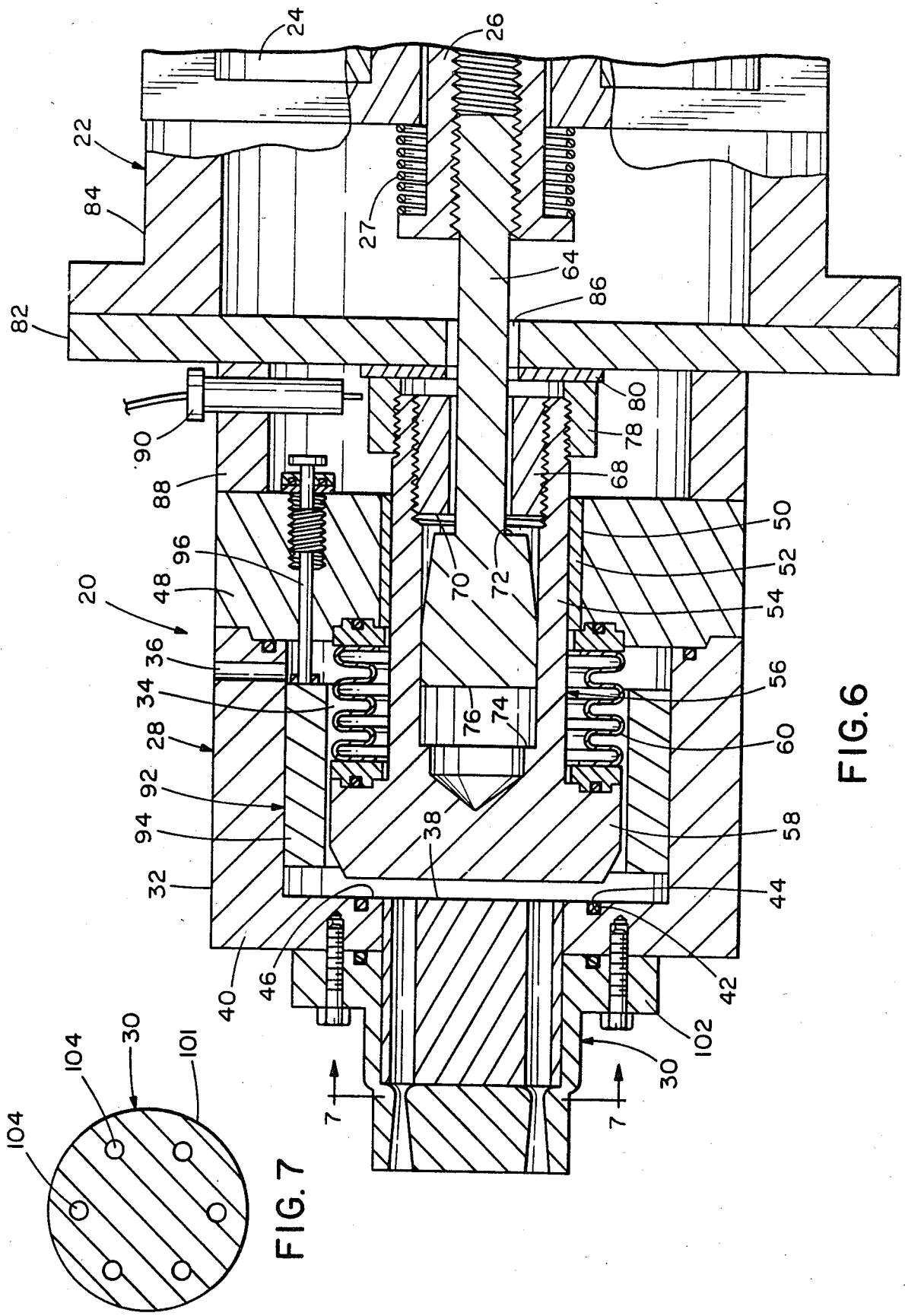

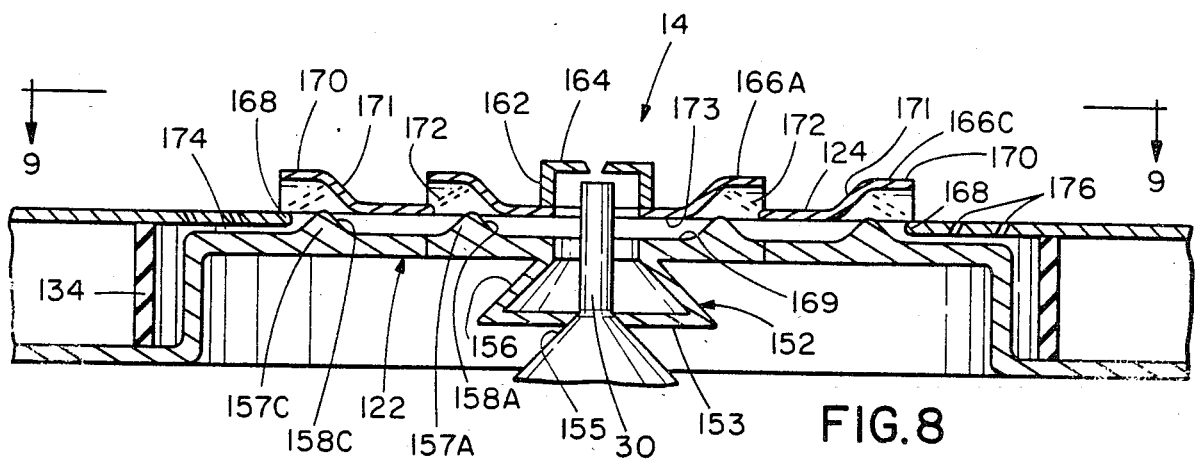
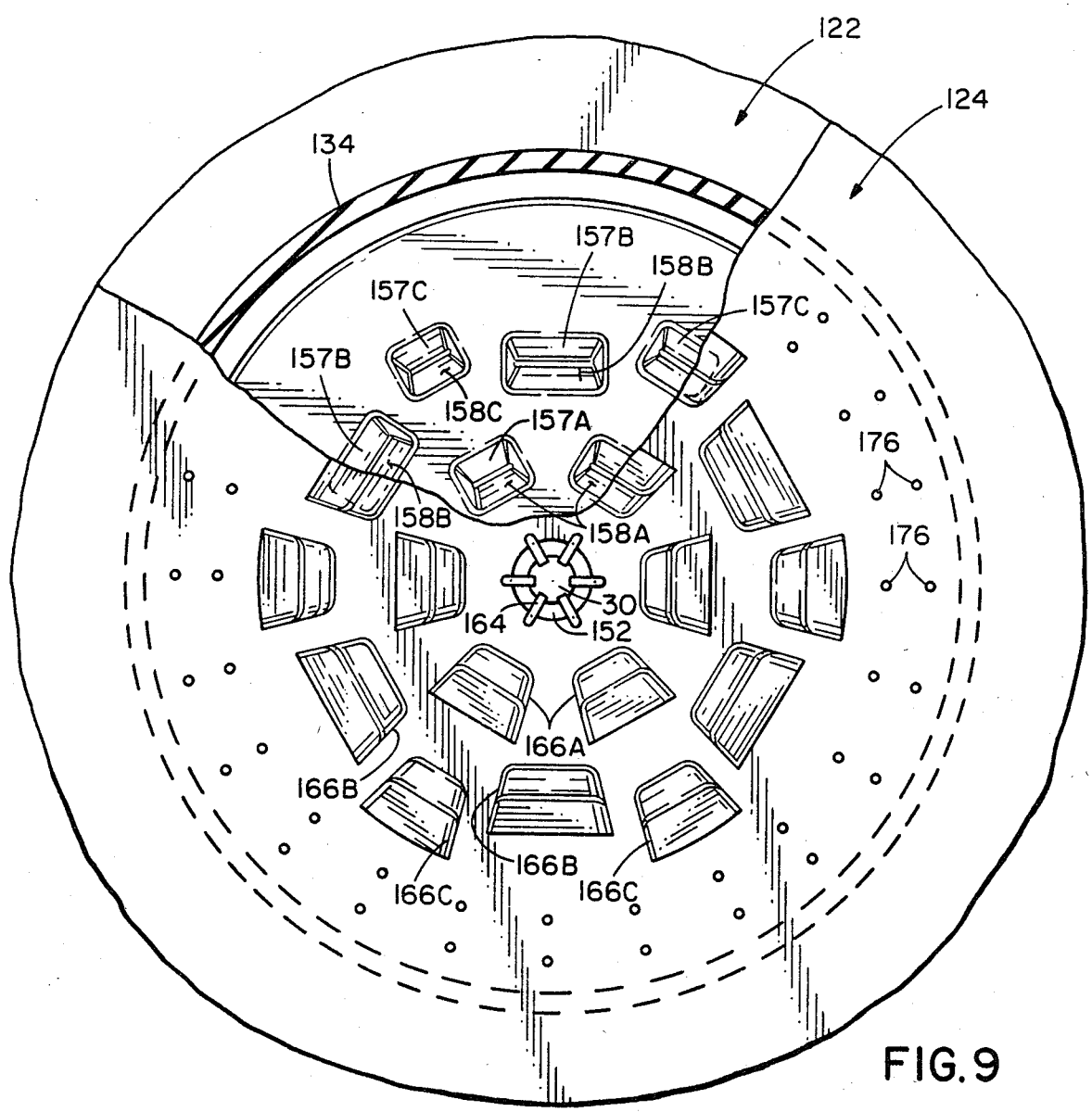

SYSTEM FOR GENERATING SOFT X RAYS

BACKGROUND OF THE INVENTION

The present invention relates to X ray generation systems and, more particularly to such systems which convert an electrical input to X rays using the phenomenon of a gas jet z-pinch.

Presently integrated circuits are manufactured using ultraviolet light lithographic systems. In such systems, the circuit pattern is determined, and a mask is prepared in accordance with the pattern. The mask is a thin plate having transparent and opaque sections according to the pattern. Upon illumination of the mask with the ultraviolet light, an image is projected onto a silicon wafer having a photoresist coating. A relief pattern replicating the mask is provided upon chemical treatment to remove either the exposed or unexposed resist (depending upon the type of resist process employed). Subsequent etching, doping or metallization steps impart the desired electrical characteristics to the wafer, and the remaining resist is removed, resulting in the formation of one level of an integrated circuit.

Commercially available ultraviolet light lithography systems offer pattern resolution on the order of 1.5–2 microns. Such a level of resolution is adequate for the production of integrated circuits such as a 256K random-access memory; however, for still larger scale integrated circuitry, lithographic systems providing submicron pattern resolution are needed, if the products are to be kept small. An X ray lithography system incorporating a pulsed plasma source provides the finer resolution desired. The system converts an electrical input to X rays using the phenomenon of a gas jet z-pinch. In this method of X ray generation, a burst of a gas (such as nitrogen, krypton or argon) is expanded using a nozzle, in concert with the fast discharge of a capacitor bank through the expanding gas. A high current discharge generates an intense magnetic field which radially compresses the plasma, a z-pinch. The result is a dense, high temperature plasma which is a very intense source of desirable X rays with comparatively long wave lengths and, hence, low penetrating power (commonly known as soft X rays). Heretofore, gas jet z-pinch devices were used for thermonuclear fusion experimentation. They were used for single-shot, as opposed to repetitive applications.

Commercial applications of repetitively pulsed plasma X ray sources for areas such as X ray lithography require long lived, highly reliable systems. Prior high power, high voltage pulsed devices have used spark gap switches employing either a single rail gap switch for generating a high current electrical discharge or an array of such switches. Unfortunately, the switches have limited life less than 1 million shots) when operated with high currents and are, therefore, not practical for low maintenance, long lived, repetitively pulsed systems. Another disadvantge of these switches is that they produce strong acoustic vibrations due to switch arcing. These vibrations adversely affect the operation of systems components, such as X ray aligners, which require very stable conditions for high accuracy positioning. Another disadvantage of spark gap switches is that they generate excessive electrical noise which can induce currents disruptive of microprocessors and electronics which may be located in close proximity.

A saturable inductor switch has been proposed for compressing the width and sharpening the rise time of high voltage pulses to an electrical discharge gas laser. For further information regarding the structure and operation of such a switch, reference may be made to U.S. Pat. No. 4,275,317.

SUMMARY OF THE INVENTION

Among the several aspects of the present invention may be noted the provision of an improved system for generating soft X rays and which is particularly useful in an X ray lithographic system. The system of the present invention avoids the use of noisy rail gap switches and generates X rays through the use of a gas jet z-pinch. The system employs a valve for supplying brief bursts of gas which valve is moved from its closed position by a hard impact from an actuator attached to a solenoid plunger, resulting in very fast valve opening. The system also includes a transmission line which includes an insulator forming, in part, a vacuum chamber for the electrical discharge, which prevents substantial quantities of debris from accumulating on the insulator to prevent flahover, and which allows rapid pump out of gases therefrom to permit high rate repetitively pulsed operation. Furthermore, the system includes a novel filter apparatus for removing undesirable by-products of the X ray generation, from the output of the system. The system is reliable in operation, has long service life, and is relatively easy and economical to manufacture. Other aspects and features of the present invention will be, in part, apparent and, in part, pointed out hereinafter in the specification and in the accompanying claims and drawings.

Briefly, the system of the present invention includes valve apparatus for providing brief bursts of gas and a magnetic pulse compression power supply for providing high current pulses. The system also includes a transmission line connected to the power supply for transmitting power pulses therefrom to discharge through bursts of gas. The power supply includes a number of series saturable inductor magnetic switches and a plurality of shunt capacitors. Upon synchronized provision of a burst of gas and a power pulse, a high current discharge generates plasma and an intense magnetic field which radially compresses the plasma resulting in a dense, high temperature plasma which is an intense source of soft X rays.

BRIEF DESCRIPTION OF THE DRAWINGS

FIG. 6, similar to FIG. 5, illustrates the valve in its open position;

FIG. 7 is a sectional view of a supersonic nozzle assembly carried by the valve, taken generally along line 7—7 of FIG. 6;

FIG. 8 is a transverse sectional view of a transmission line used in the system as shown in FIG. 1;

FIG. 9 is a plan view of the transmission line shown in FIG. 8 with certain components broken away to expose other components;

Corresponding reference characters indicate corresponding components throughout the several views of the drawings.

DESCRIPTION OF THE PREFERRED EMBODIMENT

Figure 1:
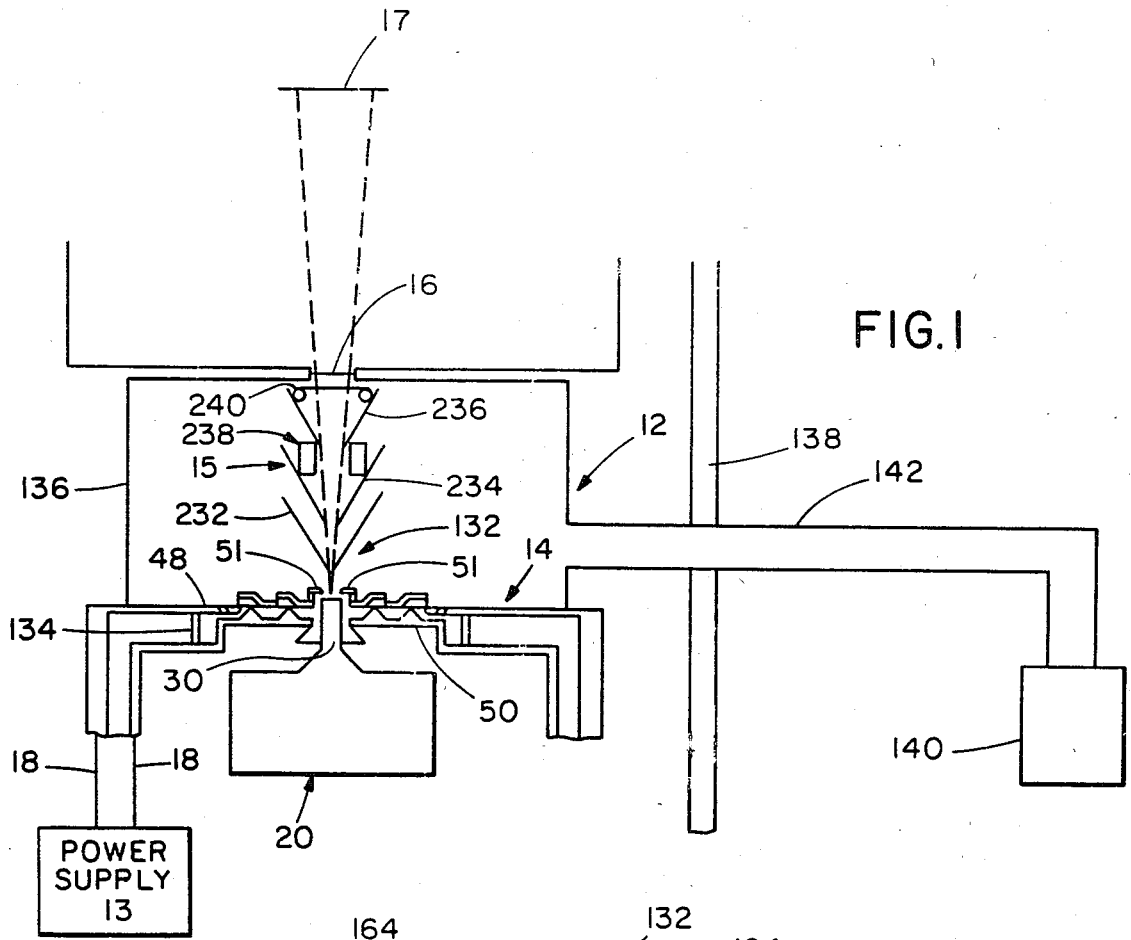
FIG. 1 is a diagrammatic representation of one preferred embodiment of the system of the present invention for generating soft X rays.
Figure 10:
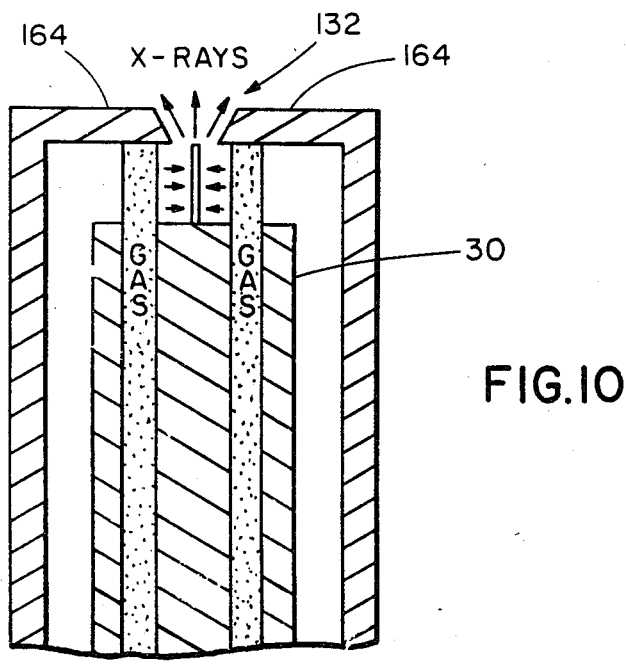
FIG. 10 is a sectional view illustrating a gas injector and electrodes for use in the system as shown in FIG. 1.
Figure 2:
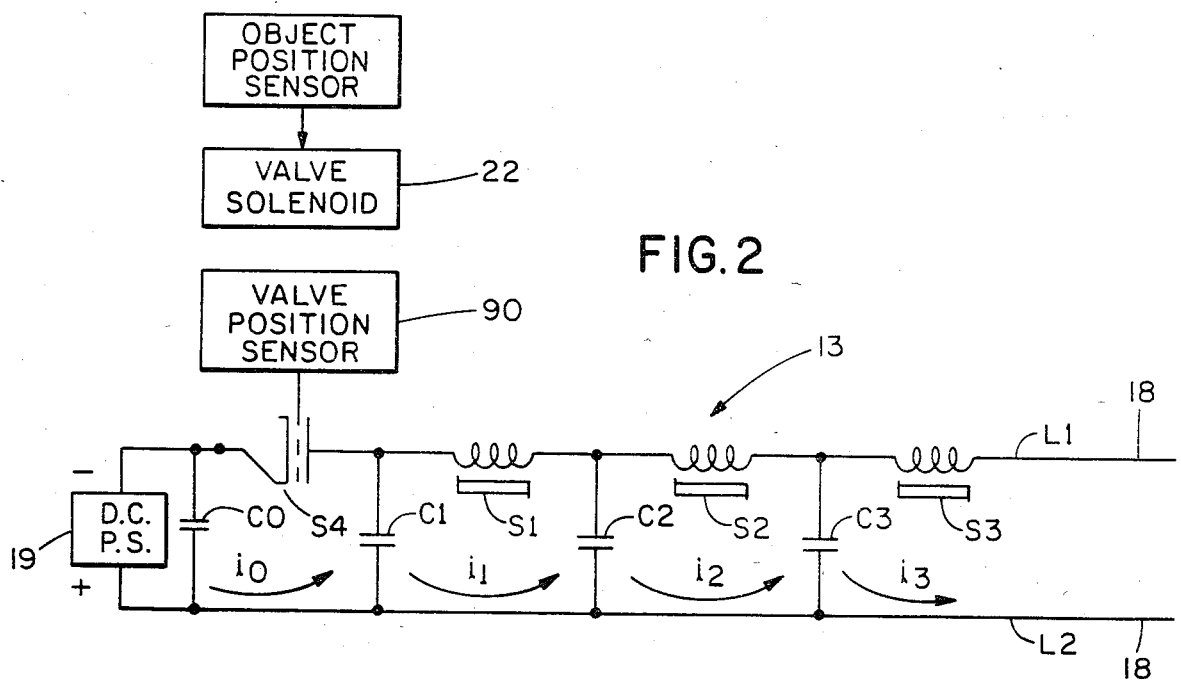
FIG. 2 is a schematic circuit diagram, partly block in nature, of a magnetic pulse compression pulse power supply included in the system of FIG. 1.
Figure 5:
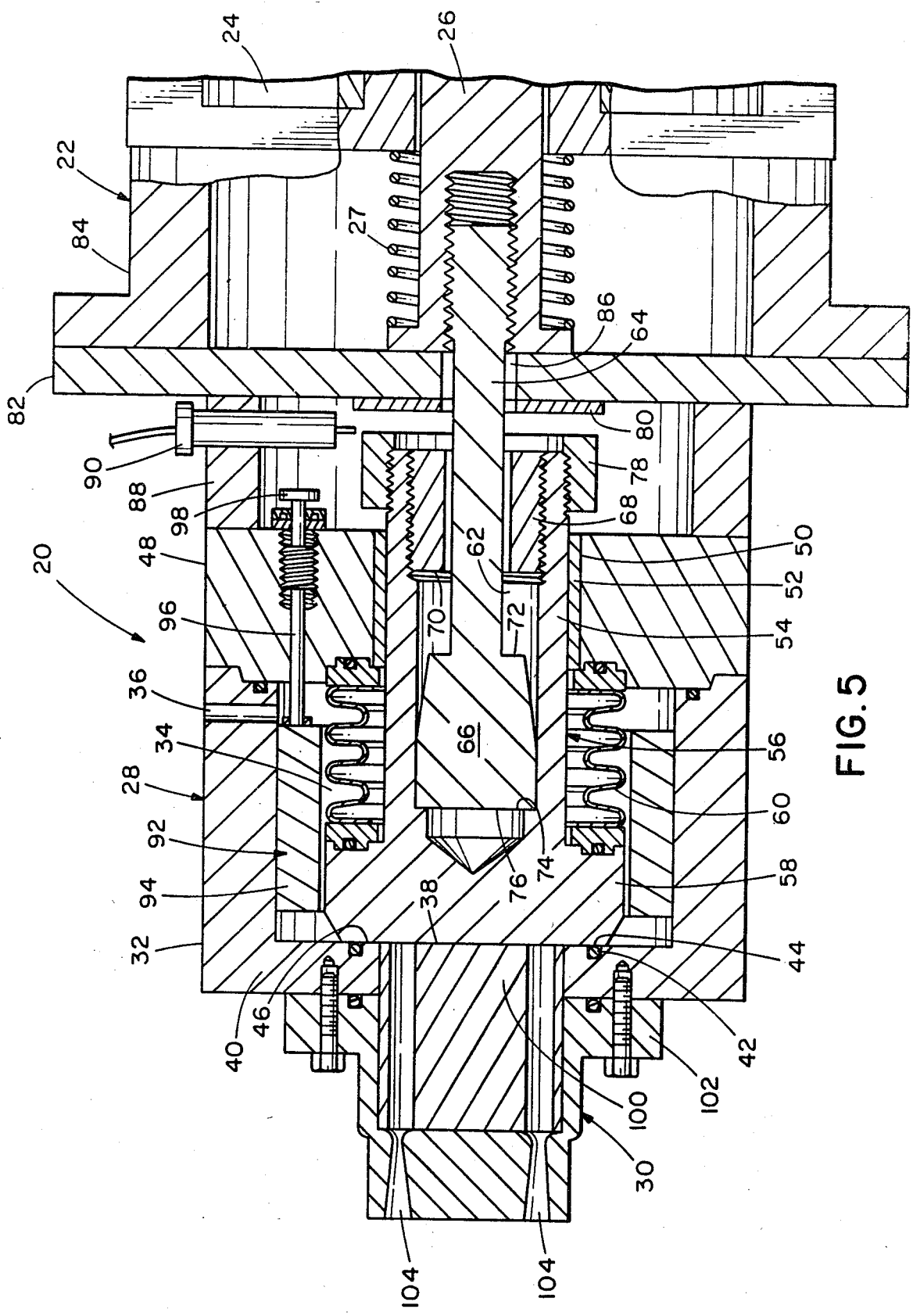
FIG. 5 is an axial cross-sectional view of a valve used in the system of FIG. 1, with certain components shown only in part, illustrating the valve in its closed position.

Referring now to the drawings, one preferred embodiment of a system of the present invention, for generating soft X rays, is generally indicated in FIG. 1 by reference character 12. The system 12 includes a magnetic pulse compression power supply 13 (best shown in FIG. 2) for providing a high current, fast rise time power pulse; and fast response valve apparatus 20 (best shown in FIGS. 5 & 6) for providing brief bursts of gas. As suggested by FIG. 10, upon synchronized provision of a burst of gas and discharge of capacitors in the power supply 13, the high current power pulse flows through the gas, generating soft X rays by a gas jet z-pinch. The system 12 also includes a transmission line 14 (best shown in FIGS. 8 and 9) connecting the power supply 13 to provide the power pulse to the gas, and filter apparatus 15 (best shown in FIG. 11) for preventing undesirable by-products of the X ray generation from reaching a window 16 through which the soft X ray output of the system 12 passes to irradiate an object 17. Finally, the system includes synchronization means for coordinating operation of the valve and power supply after the object is aligned with the window. As shown in FIG. 2, an object position sensor detects the object and controls energization of a valve solenoid 22. The valve has a valve body sensor 90 which detects that the valve has released a burst of gas and controls operation of a start switch S4 in the power supply 13.

The Magnetic Pulse Compression Power Supply

Referring to FIG. 2, the magnetic pulse compression power supply 13 includes series saturable inductor magnetic switches S1–S3 and a corresponding number of shunt capacitor banks C1–C3 with each switch and its respective capacitor bank forming a pulse compression stage: C1/S1 and C2/S2 forming intermediate pulse compression stages and C3/S3 (which is connected by conductors 18 to the load formed by a gas burst) constitutes a final or peaking pulse compression stage. The power supply further includes a standard high voltage D.C. power source 19 for charging an energy storage system which is shown as a capacitor CO and a start switch S4, which could be formed by ignitions or thyratrons, connecting the power source 19 to the first magnetic pulse compression stage.

Figure 3:
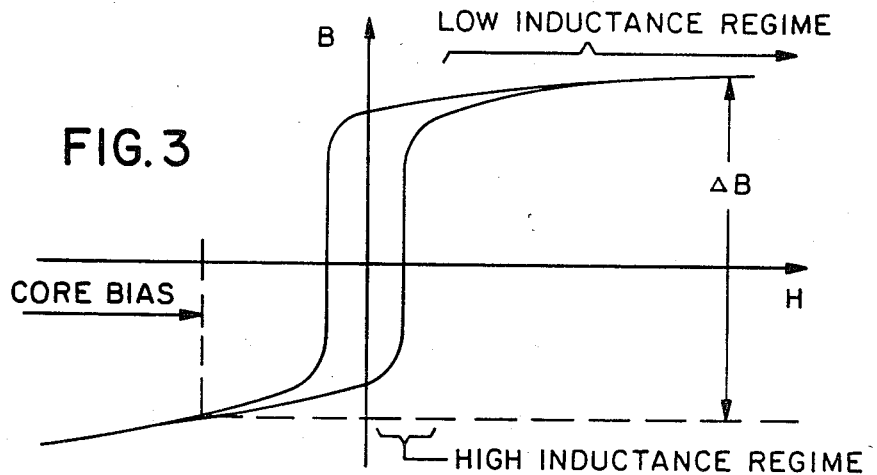
FIG. 3 is a plot of magnetizing field intensity versus magnetic flux density illustrating the non-linear inductance properties of saturable inductor magnetic switches used in the power supply of FIG. 2.

The basis of operation of the saturable inductor magnetic switches, which include magnetically permeable material, is that up to the saturation limit of that material, the switching device will exhibit high inductance. However, when with time the magnetic field builds sufficiently, the permeable material will reach saturation, causing the permeability to drop to that of an air core inductor. The non-linear inductance properties of the magnetic switches are best shown in FIG. 3, which shows the sharply cornered hysteresis loop resulting from plotting magnetizing force field intensity (H) against magnetic flux density (B).

Figure 4:
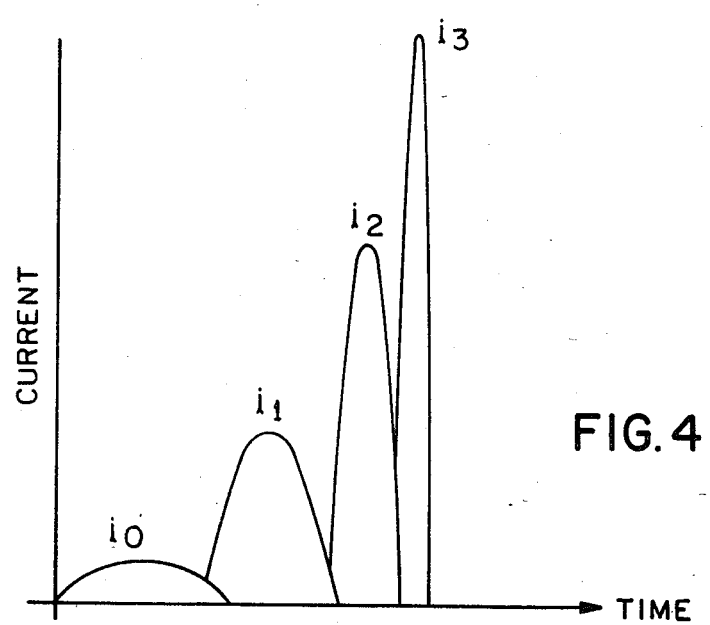
FIG. 4 is a plot of current versus time showing how the various stages of magnetic switches of the power supply function to compress a current pulse gradually until the output pulse has a fast rise time.

The current pulse compression is shown graphically in FIG. 4. It should be noted that the curves of FIG. 4 are not to scale and are only for purposes of explanation. As will be apparent to those of skill in the art, each successive capacitor has a higher voltage rating and a lower capacitance (so that successive capacitors will charge faster). Also the construction of successive saturable inductor switches varies so that successive switches saturate faster. After the energy storage system CO is charged, when the start switch S4 is placed in its conductive condition by receiving a signal from the valve body position sensor 90, a long, low-amplitude pulse charges capacitor C1. As capacitor C1 accumulates a charge as a function of time, the voltage across it rises as does the current through the switch S1. The magnetic switch S1 is saturated by the current at the time when C1 is nearly charged causing the energy in the capacitor C1 to be transferred resonantly to the capacitor C2. The process is continued from stage to stage with the pulse transfer time decreasing and the pulse energy substantially maintained so that at the end of the chain a short-duration, fast rise time, high amplitude current pulse is generated. While three pulse compression stages are shown, the number of stages needed may vary to achieve optimum efficiency for a particular plasma source.

THE VALVE

The valve apparatus 20 (best shown in FIGS. 5 and 6) comprises a solenoid 22 having a coil 24 and a reciprocal plunger 26. The plunger is movable between an extended position, shown in FIG. 5, and a retracted position, shown in FIG. 6. The position of the plunger is controlled by the state of energization of the coil 24. Its energization causes retraction of the plunger while its de-energization permits the plunger to move to its extended position under the influence of a return spring 27. Also included in the valve apparatus is a valve assembly 28 for switching the flow of a gas, under control of the solenoid, and a supersonic nozzle 30 for accelerating and shaping the gas exiting the valve assembly.

The valve assembly 28 includes a housing 32 defining a chamber or plenum 34 having a gas inlet port 36 and a gas exit port 38, the latter being formed in an end wall 40 of the housing. A valve seat 42, preferably formed by a resilient O-ring retained in an annular groove 44 on the inside surface 46 of the end wall, surrounds the exit port. Attached to the housing is a bearing wall 48, with the chamber 34 extending between the end wall and the bearing wall. This last-mentioned wall is provided with an aperture 50 in which is held a cylindrical bearing 52 preferably formed of a strong, long wearing material having low friction such as sintered bronze.

Extending through the bearing bore is the stem or shaft 54 of a valve 56 having an enlarged head 58 for selective engagement with the valve seat 42 to control the gas output of the valve assembly. The valve is reciprocable between a closed position, shown in FIG. 5, wherein the valve head engages the seat to block the output of gas, and an open position, shown in FIG. 6, in which the valve head is spaced from the seat to provide a gas output. Among the gases usable with the valve apparatus for a repetitively pulsed X ray source application, are nitrogen, krypton and argon. Prolonged exposure to such gases in a plasma discharge machine could result in contamination or corrosion of the bearing. In order to isolate the bearing 52 from the chamber 34, a resilient bellows type seal 60 is used and has its ends anchored on facing surfaces of the bearing wall 48 and the valve head 58, respectively. This resilient seal serves a dual purpose because it also functions as a return spring to bias the valve to its closed position.

The valve stem 54 is cylindrical, having a bore 62. The valve apparatus 20 further includes an actuator 64 attached to the solenoid plunger 26, preferably by means of a threaded arrangement. The actuator extends into the valve stem bore and terminates in an enlarged distal end 66. Closing the valve stem bore to passage of the distal end 66 is an abutment means in the form of a nut 68 threadably carried by the stem and having an impact surface 70. The actuator distal end 66 has a hammer surface 72 facing the impact surface 70 in an interfering relationship and spaced therefrom in the valve closed/coil deenergized position of the valve apparatus, as shown in FIG. 1, a distance less than the travel of the plunger 26. Accordingly, energization of the coil 24 results in movement of the valve 56 toward its open position by hard impact.

More specifically, the valve has a positioning surface 74 facing the impact surface, and the actuator distal end has an engagement surface 76 for contacting the positioning surface so that the hammer surface 72 of the actuator is located a predetermined distance from the impact surface when the coil 24 is deenergized. The valve stem also threadably carries on its outside surface a stop nut 78 which is engageable with an abutment plate 80 carried by a support wall 82 to which both the solenoid housing 84 and the valve assembly are attached. This support wall is provided with a central window 86 sized to permit unimpeded passage of the actuator 64. A cylindrical valve housing extension 88 interconnects the bearing wall 48 and the support wall 82, and carries a sensor 90 (extending through a window in the extension) providing an output indicative of the position of the valve. Preferably, a fiber optic position sensor is employed for use in providing an output received by a controller for coordinating operation of the power supply 13 in accordance with actuation of the valve.

The valve assembly further includes a volume excluder 92 having a plug portion 94 disposed between the axially extending portion of valve housing 32 and the valve head 58. The excluder also has a shaft 96 adjustably threadably carried by the bearing wall 48. By turning a knob 98 on the end of the shaft 96, the operator can vary the spacing between the plug portion 94 and the housing end wall 40 to adjust the volume of gas that will be discharged upon opening of the valve. It will be appreciated that the relatively narrow spacing between the plug portion 94 and the valve head 58 forms a restriction preventing a substantial quantity of gas in addition to that in front of the plug portion from being discharged during the short time the valve is open. On the other hand, this narrow passageway is sufficiently large for the space in front of the plug to refill during the relatively long closed portion of the operating cycle of the valve. The adjustability of the stop nut 78 and the volume excluder 92, in addition to the adjustability of the gas pressure, permit selection of a wide range of gas output pulses.

The nozzle assembly 30 is carried by the housing end wall 40 and has a plenum portion 100 extending to the gas exit port 38. As best shown in FIG. 7, the nozzle assembly has a main portion 101, including a peripheral mounting flange 102 shown in FIGS. 5 and 6, defining a plurality of discrete supersonic nozzles 104 (preferably six) spaced uniformly about the axis of the nozzle for accelerating the gas output.

While most components of the valve assembly 28 are preferably made of brass or aluminum, the valve and the actuator are preferably fabricated of titanium for long wear and impact resistance. The combined mass of the plunger 26 and the actuator 64 is preferably about equal to but slightly less than the mass of the valve 56. The momentum transfer from the plunger and actuator to the valve occurs within an acoustical relaxation time, the time it takes the pressure wave, formed at the impact surface upon being hit by the hammer surface, to travel the length of the nut 68. For a plunger/actuator mass of about 75 grams the momentum transfer occurs is approximately 60 microseconds. Under these conditions and with a plenum pressure of about 50 atmospheres, the valve moves about 0.2 centimeters to its open position in about 200 microseconds. For a seal diameter of 2 centimeters, the effective exit aperture, supplying gas to the exit port 38, has an effective area of about 1.25 square centimeters (2 centimeters [diameter]$\times 3.14$ [pi]$\times 0.2$ centimeters [valve travel]). This results in a gas throughput of about $3 \times 10^5$ torr liters/second.

Operation of the valve apparatus 20 is as follows: Electrical energization of the solenoid coil 24 results in movement of the plunger 26 away from its extended position, shown in FIG. 5. The spacing between the impact surface 70 of the nut 68 and the hammer surface 72 of the actuator represents lost motion travel of the actuator 66 and the plunger 26. As the plunger and actuator travel this distance they accelerate. Preferably, just prior to impact, the coil is deenergized. Assuming that the coefficient of restitution of the colliding bodies is near unity (the impact is almost elastic), the plunger/actuator momentum will be substantially entirely transferred to the valve because the components are selected to have equal mass.

This results in very fast movement of the valve 56 to its open position shown in FIG. 6. As the valve moves to its open position, potential energy builds in the resilient bellows seal 60 as it is compressed, resulting in deceleration of the valve. There may be some bounce of the valve when the stop nut 78 hits the abutment plate 80. However, the main factor in the relatively fast return of the valve to its closed position is the powerful spring characteristic of the bellows seal. In the meantime, the return spring 27 returns the plunger 26 and the actuator 64 to their extended positions shown in FIG. 5. Thus, the valve apparatus is in position for another cycle of operation.

Commercially available DC solenoids offer precision bearing surfaces and have low friction coatings to extend their mechanical life time to greater than one million operations. The coils of these magnets have several thousand turns of wire and they operate at less than 1,000 volts and draw a current of only a few amperes. A DC solenoid capable of operating 10 times per second, may well require less than 200 watts of average power for use with the fast valve assembly of the present invention.

Accordingly, the valve apparatus 20 is well suited for use in the system 12 for converting an electrical input to X rays using the gas jet z-pinch. The valve offers a very large gas throughput and the valve assembly opens in less than 200 microseconds. The valve assembly is adjustable to permit selection of the quantity of gas emitted per operating cycle, and the valve apparatus can be operated over long periods at high repetition rates. It will be further appreciated that the valve apparatus offers the ability, through the valve position sensor in concert with the fast opening and closing times of the valve, to synchronize operation of the valve assembly very closely with other components of the system 12, particularly with operation of the power supply 13. Thus, the valve apparatus minimizes gas ejection which is late with respect to the high current discharge through the gas. This late time gas ejection is not only of no use in generating X rays but it also overloads the vacuum system associated with the X ray generation system, which will be described more fully hereinafter.

THE TRANSMISSION LINE

The transmission line 14 (best shown in FIGS. 8 and 9) is connected to the magnetic pulse compression power supply 13 for transmitting power pulses to discharge through bursts of gas from the valve apparatus 20. The line 14 includes a first conductor 122 in the general form of a circular plate, and a second conductor 124, also in the general form of a circular plate (see FIG. 9), disposed adjacent to, but spaced from and parallel to the conductor 122. The first conductor 122 has a central aperture 126 for receiving the nozzle 30 of the valve apparatus 20. The nozzle 30 functions as an injector and will be hereinafter referred to as an injector. The second conductor has electrode means 164 overlying the injector 30 to act as an anode for the load, which is constituted by a brief burst of gas from the injector. A ring-shaped insulator 134 extends between the conductors 122, 124 and partially defines a vacuum chamber 136 for the load. The conductor 122 is connected to either the negative side or the positive side of power supply 13, while the conductor 124 is connected to the opposite side of the power supply.

With reference to FIG. 1, the X ray generation system 12 incorporating the transmission line 14 includes the vacuum chamber 136 partially formed by the insulator 134 and containing the injector 30. The main operating parts of the X ray generation system may be located in a clean room having a wall 138, with one or more vacuum pumps 140 located outside the clean room and connected to the vacuum chamber 136 by means of a manifold 142. As suggested by FIG. 10, upon discharge of the fast discharge capacitor banks of the power supply 13 in synchronization with opening of the valve apparatus 20, high current flows through an expanding burst of gas (which may be nitrogen, krypton or argon), forming a plasma. As the current flows, an intense azimuthal magnetic field is generated which radially compresses the plasma. A large kinetic energy is acquired by the particles in the plasma during its rapid compression. This energy is thermalized as the plasma stagnates on its axis, resulting in the intense generation of soft X rays. Additionally generated are unwanted hot gases, charged particles (primarily electrons), ultraviolet radiation and debris in both gaseous and non-gaseous forms.

Turning to the specific construction of transmission line 14, best shown in FIGS. 8 and 9, the first conductor 122 carries a pit or debris dump 152, surrounding the injector 30 for reception of debris in solid or liquid form. The dump includes a floor 153 having a central opening 155 for receiving the injector 30. Various materials may be applied to form a vacuum tight seal between the floor 153 and the injector 30. Additionally, the dump 152 has an inclined annular side wall 156 interconnecting the conductor 122 and the floor 53. The first conductor 122 also includes flow deflectors 157A, 157B, 157C extending toward the second conductor 124 and arranged in concentric annular arrays, and each defelector has a first surface 158A, 158B, 158C, respectively, facing the injector 30. The second conductor 124 has a plurality of parallel spaced standards 162 with each standard carrying a radially inwardly directed post 164. The standards 162 and the posts 164 constitute the electrode means 132 which provides a path for the current passing through the gaseous load. Preferably, one supersonic nozzle 104 of the injector 30 is aligned with the distal end of each post 164.

As best shown in FIGS. 8 and 9, the second conductor 124 includes louvers 166A, 166B and 166C arranged in annular arrays with the position of each louver matching that of a corresponding flow deflector. Each louver comprises a lower section 168 and an upper shield portion 170 at least partially overlying a corresponding lower section 168, with the shield portion joined to the lower main portion of the conductor 124 by an intermediate portion 171. Each louver defines an aperture 172 for venting hot gases resulting from the electrical discharge through the gas burst. It will be appreciated that each louver forms, along with its corresponding flow deflector, a nozzle. The spacing between the facing portions of the first surface 158 of the flow defelector and the intermediate portion 171 of a corresponding louver 166 is less than between corresponding first and second conductor surfaces 169, 173 disposed perpendicular to the axis of the injector 30 and closer to the injector. It will be further appreciated that the first surfaces 158 function as flow guides to direct hot gases through the apertures 172 from between the conductors of the transmission line. The louver/deflector combinations are preferably staggered so that any radial line drawn from the axis of the injector between the conductors intersects one or more of the combinations to more effectively eject the gases.

Adjacent the insulator 134, the first and second conductors form a choke region 174. The spacing between the first and second conductors in the choke region is further reduced from that between facing portions of a flow deflector first surface 158 and the intermediate portion 171 of a corresponding louver 166, and the portion of the conductor 124 defining the choke region is provided with a number of holes 176 for further venting gases including debris to prevent their contamination of the insulator 134. The conductors 122, 124 are preferably constructed of a strong, highly conductive metal such as aluminum or brass. The insulator 134 preferably has a dielectric strength of at least 10 kV per centimeter and preferably is constructed of a plastic or a ceramic material. Outside of the insulator 134, the space between the conductors is filled with a liquid or solid material offering high dielectric strength.

Operation of the transmission line 14 is as follows: Upon synchronized provision of a burst of gas from the injector 30 and application of a high power D.C. pulse by the power supply 13, current flows successively through the conductor 124, through the gas, through injector 30 and is returned to the power supply via the conductor 122. Due to the resulting gas jet z-pinch, X rays are generated along with by-product hot gases, and charged particles, ultraviolet light and debris, both in gaseous and non-gaseous form, resulting from, for example, surface ablation of the metallic materials of the transmission line and injector. A substantial amount of the debris in liquid and/or solid form falls into the dump 152 encompassing the injector 30 while the hot gases and debris carried therewith are accelerated and ejected from the transmission line due to the nozzles formed by the flow deflectors 157 and their corresponding louvers 166. It is noted that the choke region 174 formed by the first and second conductors restricts the flow of gases toward the insulator 134, thereby additionally functioning to cause a larger portion of the hot gases to be vented by the apertures 172. The shield portions 170 of the louvers, which overlie the apertures 172, prevent substantial portions of the gases or particles of debris carried therewith from returning to the space between the conductors. Further venting of the gases is effected due to the presence of the relief holes 176 in the portion of the second conductor 124 defining the choke region 174.

Not only do the nozzles formed by the first and second conductors result in venting of hot gases and particles, they also allow for rapid evacuation of the transmission line so that it may be used for rapid pulsed operations, for example, at approximately 10 Hertz. Thus, the transmission line 14 allows substantially debris-free operation of the insulator 134 while ensuring that the insulator has sufficiently low electrical stresses for long and reliable operation. Additionally, the transmission line permits rapid pump out of gases from between the conductors so that a high rate repetitively pulsed operation is feasible.

THE FILTER APPARATUS

Figure 11:
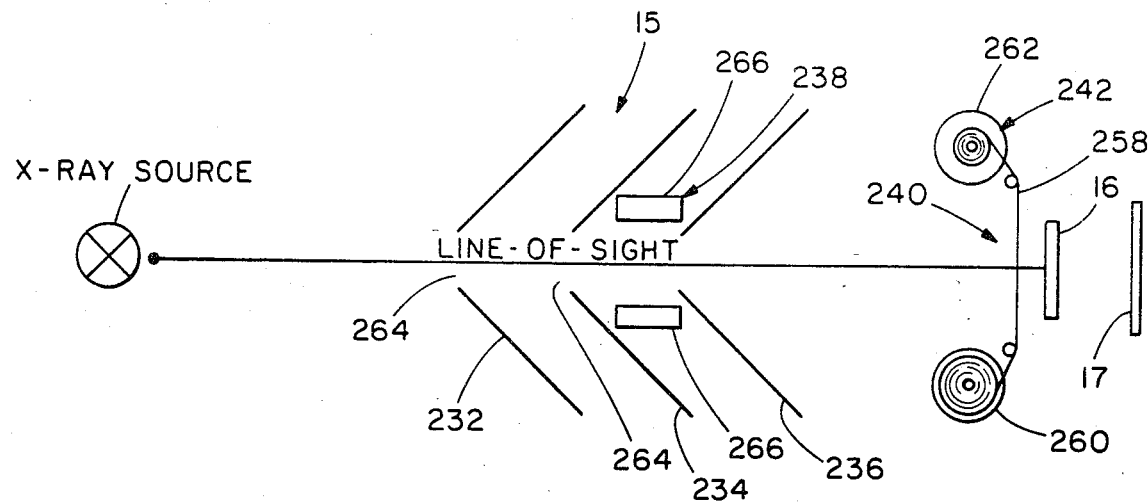
FIG. 11 is a diagrammatic representation of filter apparatus as used in the system shown in FIG. 1.

Referring now to FIG. 11, the filter apparatus 15 functions to prevent hot gases, charged particles and ultraviolet light from reaching the output window 16. The filter apparatus 15 includes baffles 232, 234, 236 for diffusing hot gases and directing them away from the window, a magnet system 238 for creating a magnetic field to deflect charged particles (primarily electrons), and an ultraviolet absorption system 240 for absorbing ultraviolet radiation from the X ray radiation impinging upon the object 17.

The window 16 is preferably formed of a thin sheet of beryllium which has high mechanical strength and, because of its low atomic number, good transmission characteristics with respect to soft X rays. The absorption system 240, which protects the window 16 from ultraviolet radiation, includes a long thin strip of an ultraviolet light absorbing plastic film 258, such as a polyimide, which is wound on a feed spool 260. The leading end of the length of film is held by a take up spool 262 with the spools positioned so that a section of the material extends across the window 16 in the direct path from the X ray source. Preferably after each generation of X rays, the film is advanced, so that a fresh (non-irradiated) film section is brought into registration with the window. It will be understood that the feed roll includes proper shielding to prevent premature irradiation of the film wound thereon. The spools are advanced after X ray generation by means of a rotary drive (not shown) having a shaft extending through a seal in the wall of the vacuum chamber 136. Such rotary drives and seals therefor are well known to those of skilled in the art and need not be further discussed here.

Particularly in the use of the X ray generation system 12 for lithography in manufacturing very large scale integrated circuits, it is necessary to substantially eliminate ultraviolet radiation from the soft X ray output. If this is not done, the desirable submicron pattern resolution will not be attainable and the beryllium window could be damaged. Of course, the film 258 provides for substantial elimination of the ultraviolet light from the output. However, the film and the window, in turn, must be protected from hot gases and charged particles which are by-products of the X ray generation. This is the function of the baffles 232-236 and of the magnet system 238.

More specifically, each of the baffles is preferably generally conical, as shown in FIG. 11, with a central opening 264. The baffles are disposed successively between the X ray source and the window 16, with the several openings 264 in alignment and defining a line of sight X ray path. The baffle 232 closest the X ray source is preferably constructed of a refractory material which also is an absorber of soft X rays, to limit the magnitude of the X rays impinging on other components of the filter apparatus. A preferred material for the first baffle is a tungsten alloy. The remaining baffles 234, 236 are spaced downstream of the first baffle and are preferably formed of aluminum or brass. The magnet system 238 preferably includes a plurality of permanent magnets or electro-magnets 266 spaced about the X ray path for deflecting charged particles away from the film and the window. The magnet system 238 constitutes a means for deflecting charged particles. However, an electrostatic system could also be employed for this purpose.

By way of example, a 25 micron thick ductile beryllium window provides adequate mechanical strength and transmits 62 percent of the 6.9 Angstrom soft X rays generated using krypton as the gas.

Operation of the filter apparatus 15 is as follows: The first baffle 232, while passing soft X rays through its aperture or central opening 264, absorbs soft X rays impinging on the surface of the baffle while at the same time direction diffusing expanding hot gases away from the line of sight between the X ray source and the transmission window 16. The second and third baffles 234, 236 also function to further eliminate hot gases diffusing from the path towards the window, thereby reducing the temperature to which the window and the film will rise. The magnets 266 operate to deflect the charged particles away from the film 258 and the window 16. Finally, the ultraviolet light absorption film 258 eliminates about 98% of the ultraviolet light to substantially limit the output of the window to soft X rays. The soft X rays then pass to the object 17. After each X ray generation, the feed spool 260 and take-up spool 262 are advanced to bring a fresh section of the sacrificial plastic film in alignment with the window.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A system for generating soft X rays comprising:
   valve apparatus for repetitively providing bursts of gas of brief duration;

a magnetic pulse compression power supply for providing high current pulses;

a transmission line connected to said power supply for transmitting power pulses from said supply through said bursts of gas, said power supply including a plurality of series saturable inductor magnetic switches and a plurality of shunt capacitors; and means for synchronizing operation of said valve apparatus and said power supply, whereby upon synchronized provision of a burst of gas from said valve apparatus and a power pulse from said power supply, a high current discharge generates plasma and an intense magnetic field which radially compresses the plasma resulting in a dense, high temperature plasma which is an intense source of soft X rays.

2. A system as set forth in claim 1 further comprising a vacuum chamber with said high current discharge occurring in said vacuum chamber.

3. A system as set forth in claim 2 further comprising a window for transmitting X rays to an object to be irradiated, said window and said transmission line partially defining said vacuum chamber.

4. A system as set forth in claim 3 further comprising means for collecting debris and removing undesirable components which are by-products of said X ray generation.

5. A system as set forth in claim 1 wherein said valve apparatus comprises:

a solenoid including a coil and a reciprocating plunger having a retracted position and an extended position, the position of which is controlled by the state of energization of said coil; and a valve assembly for operation by said plunger, said assembly comprising:

a housing defining a chamber having a gas inlet port and a gas exit port with a valve seat surrounding said exit port;

a bearing defining an aperture; and a valve closure member having a head disposed in said chamber for selective engagement with said valve seat to block said exit port, and further including a valve stem projecting from said head and through said aperture, said valve closure member being movable between a closed position wherein said head engages said seat and an open position wherein said head is spaced from said seat; and means for biasing said valve closure member to its closed position, said valve stem carrying abutment means having an impact surface facing said head, said valve apparatus further comprising an actuator attached to said plunger with said actuator extending past said abutment means and terminating in a distal end having a hammer surface facing said impact surface and disposed in interfering relationship therewith, said hammer surface being spaced from said impact surface when said coil is deenergized by a distance less than the travel of said plunger, whereby energization of said coil causes fast opening of said valve by hard impact.

6. A system as set forth in claim 2 wherein said transmission line comprises:

a first conductor electrically connecting one side of a load constituted by a burst of gas and one side of said power supply;

a second conductor disposed adjacent to, but spaced from, said first conductor and electrically connecting the other side of the load and the other side of said power supply;

an insulator extending between said conductors and partially defining said vacuum chamber;

means disposed between said load and said insulator for receiving debris in non-gaseous form; and means disposed between said load and said insulator for ejecting debris in gaseous form from between said conductors.

7. A system as set forth in claim 4 wherein said means for collecting and removing comprises:

a baffle for directing diffusing hot gases away from said window; and means for absorbing ultraviolet light from the beam of X rays passing through said window from said X ray source.

* * * * *